H. Woodman.

Machine for Cleaning the Top Cards of Carding Engines.

No. 2,202. Reissued Mar. 13, 1866.

N. PETERS, PHOTO-LITHOGRAPHER, WASHINGTON, D. C.

H. Woodman.

Machine for Cleaning the Top Cards of Carding Engines.

No. 2,202. Reissued Mar. 13, 1866.

N. PETERS, PHOTO-LITHOGRAPHER, WASHINGTON, D. C.

UNITED STATES PATENT OFFICE.

HORACE WOODMAN, OF SACO, MAINE.

IMPROVEMENT IN MACHINERY FOR CLEANING TOP-FLATS OF CARDING-ENGINES.

Specification forming part of Letters Patent No. 15,313, dated July 8, 1856; Reissue No. 2,202, dated March 13, 1866.

*To all whom it may concern:*

Be it known that I, HORACE WOODMAN, now of Saco, but formerly of Biddeford, in the county of York and State of Maine, have invented Improved Machinery for Cleaning the Top Cards of Carding-Engines; and I do hereby declare that the same is fully described and represented in the following specification and the accompanying drawings, letters, figures, and references thereof, making a part of the specification.

My said invention relates to mechanism for moving the cleansing-frame forward and backward from one top card to another; to mechanism for holding the cleansing-frame firmly in place while the top cards are raised, cleaned, and restored to their seats; to mechanism for changing the position of the cleansing-frame relatively to the top cards, for the purpose of cleaning different series of top cards; to mechanism for giving the motions to the devices used for raising, cleaning, and restoring the top cards, and to mechanism for removing the waste from the cleaning-bar.

The nature of my invention will be more fully understood by the following description and recital, reference being had to the annexed drawings.

Figure 1:
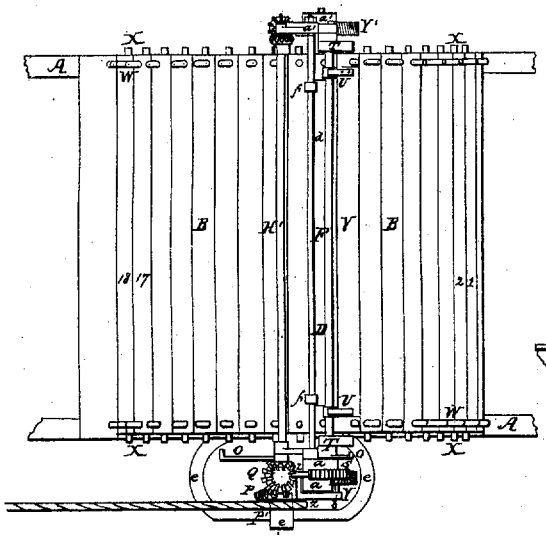
Figure 2:
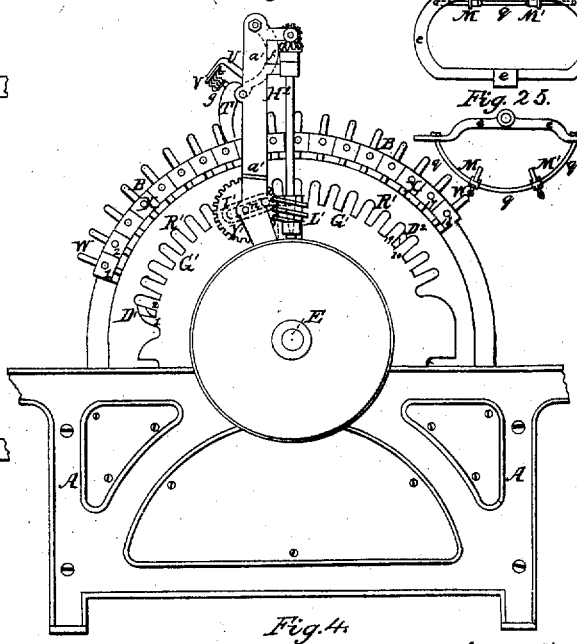
Figure 3:
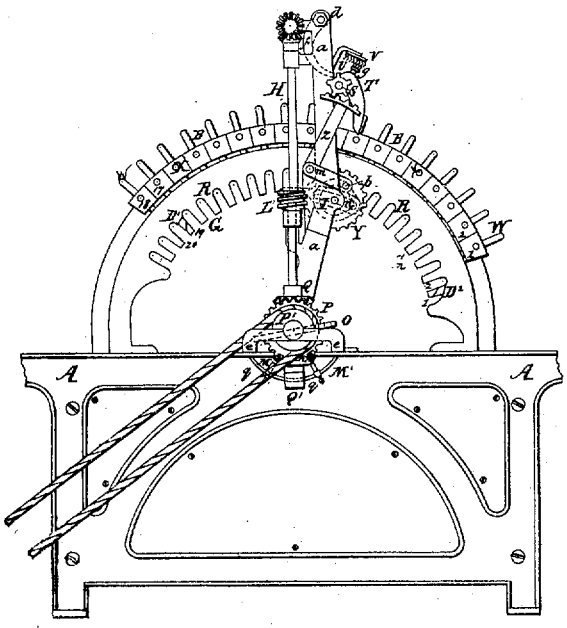
Figure 4:
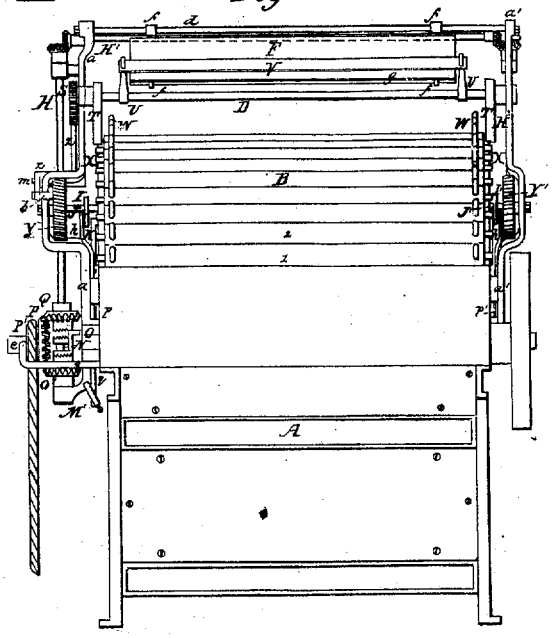
Figure 5:
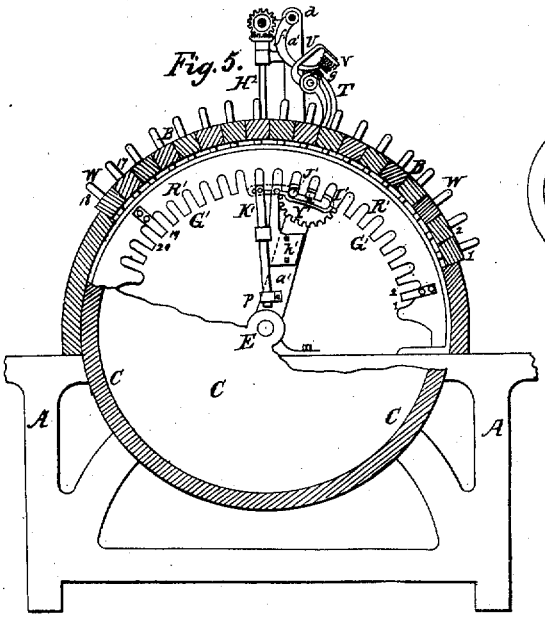

Of the said drawings, Figure 1 denotes a top view of the carding-machine provided with my improvement. Fig. 2 is an elevation of that end of it called the "driving end," or the end to which the driving-power is applied to the card. Fig. 3 is an elevation of the opposite end, to which the driving-power is applied to my cleansing or stripping machinery. Fig. 4 is a rear elevation. Fig. 5 is a transverse section of it, giving a central or inside view of parts of my improvement in connection with and partially obstructed by the arch of top cards.

Other figures, representing detached parts of my improvement, are given in my drawings, and will be hereinafter referred to and described in giving a full delineation of the machine.

In the first place, A represents the main frame of the carding-machine, while B B B denote a series of top cards thereof, each of which cards is composed of a bar or lug, B, having a strip of card filleting or teeth thereon, fixed on its under surface in the usual manner. The main card-cylinder is shown at C, many of the remaining well-known working parts of the carding-machine not being represented in the drawings, they having no special reference to my improvement, being such as are in general use.

Figure 24:
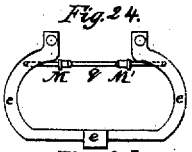
Figure 25:
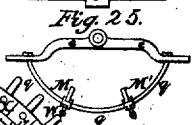
Figures 6, 7, 8, 9, 10, 11:
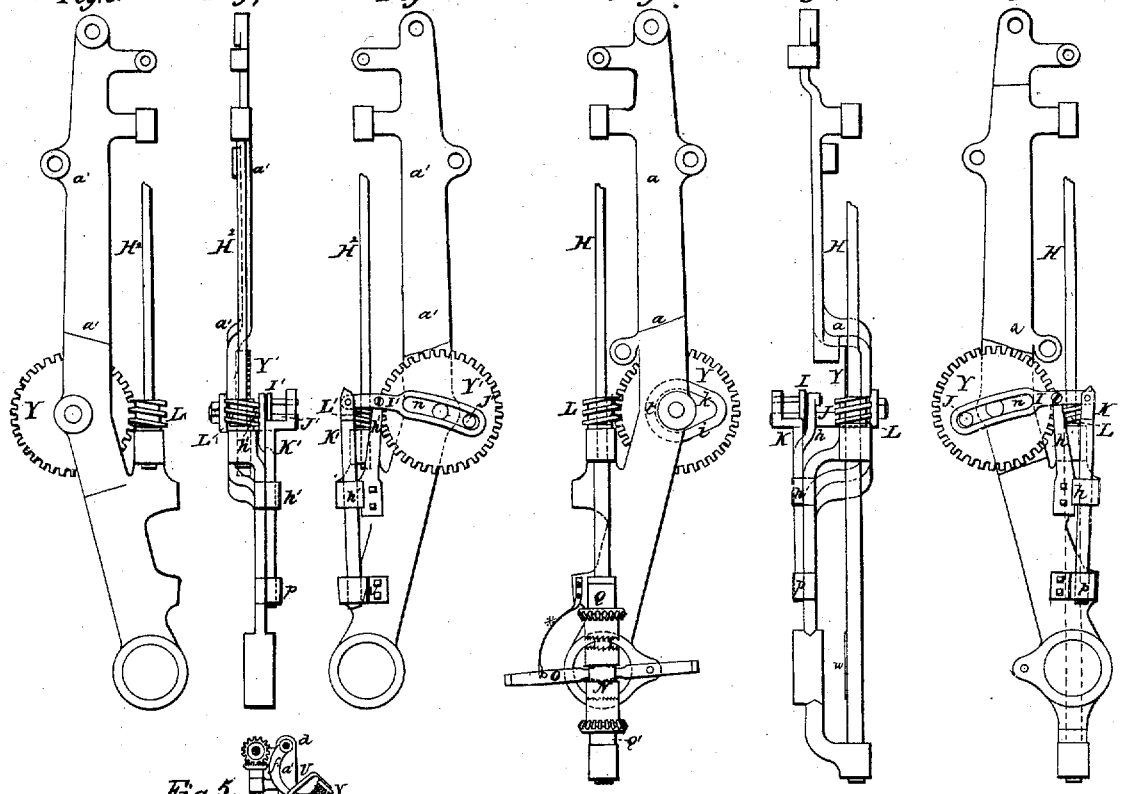
Figures 12, 13, 14, 15, 16, 17, 18:
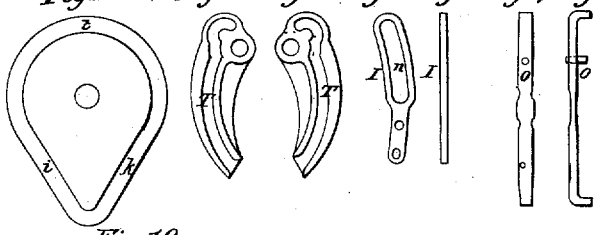
Figure 19:
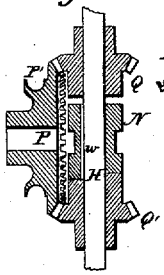

I make use of two arms, *a* and *a'*, and a cross-connection bar, *d*. These form a frame which may be called the "cleansing-frame," which is made to extend upward or outward from and turn freely on the boxes of the main shaft E of cylinder C, the two arms *a* and *a'* being placed outside the cylinder, as is seen in Figs. 1, 2, 3, and 4 of the drawings. The form and parts of arms *a* and *a'* are most plainly seen in Figs. 6, 7, 8, 9, 10, 11 of the drawings, where they are represented in connection with some other parts of my improvement, Fig. 6 representing an end or outside view, Fig. 7 a side or cross view, and Fig. 8 a central or inside view, of arm *a'* and such other connected parts as are given in said figures, and Figs. 9, 10, and 11 representing the same series of views of arm *a* and such other parts as are given in connection in either of said figures. There are sustained in suitable bearings in arms *a* and *a'* (which bearings are seen in said Figs. 6 to 11) shafts H, H', and $H^2$, which are connected together by bevel-gears, as seen in the full drawings, and which shafts turn freely in said bearings. Stand *e*, a top view of which is given in Fig. 24, and an end view in Fig. 25, is affixed to the end of the card-frame which is the driving end of my top-card-cleaning devices by means of bolts. Said stand supports a stud, the axis of which is on a line with the axis of the cylinder-shaft. There is placed on this stud a bevel-gear, P, and driving-pulley P', which turns freely on said stud. Said bevel-gear P engages with two smaller bevel-gears, Q and Q', which turn freely on said shaft H. There is placed on shaft H, between gears Q and Q', a clutch, N, said clutch sliding freely on said shaft in the space between said gears Q and Q'. Said clutch is attached to said shaft F by means of a spline, W, embedded in said shaft, and fitting a groove cut in the hollow bearing of said clutch, as seen in Fig. 19 of the drawings, which gives a central and longitudinal section of said pulley, bevel-gears, clutch, spline, and portion of shaft H. The said clutch is provided with teeth at each of its ends corresponding to teeth on the inner ends of the hubs of gears Q and Q′, as seen in Figs. 9 and 4 of the drawings, the teeth on the ends of the clutch working alternately into the teeth on the hubs of said gears Q and Q′, and giving rotary motion to said shaft H whenever so engaging in the teeth of either of said gears Q and Q′, and reversing the rotary motion of said shaft, as it changes from the teeth of one to the teeth of the other, (said spline *w* on shaft H is more plainly represented in Fig. 10 of the drawings.) There is also cut around said clutch a groove, (as seen in Figs. 4, 9, and 19,) in which lever *o* (as seen in Fig. 17 in side view and in Fig. 18, an edge view) bears and engages for the purpose of changing said clutch from the teeth of one of said gears to the teeth of the other. The manner of moving said clutch by said lever will be explained hereinafter.

The rotary motion given to shaft H produces a rotary motion of shaft $H^2$ by means of said connecting bevel-gears and of horizontal shaft H′. Upon shafts H and $H^2$ are fixed worms L and L′, as seen in Figs. 2, 3, 6, 7, 9, and 10, which worms engage with and communicate rotary motion to worm-gears Y and Y′, which worm-gears Y and Y′ turn freely on studs or axles on arms *a* and *a′*, as seen in the drawings, and are most distinctly seen in Figs. 6 to 11. In the outer side of gear Y is cut a cam-groove, the form of which is shown in Fig. 12.

Figure 20:
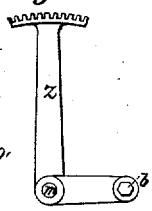
Figure 21:
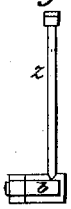

Bent lever *z*, formed as shown in Fig. 20, vibrates freely on a stud or axle, M, placed on the cleanser-frame arm *a*, as seen in the drawings. From the short arm of the lever *z* projec's a round pin, *b*, as shown in Fig. 21. This pin *b* enters and traverses in the cam-groove in gear Y. On the long arm of said lever is a series of teeth arranged in the arc of a circle whose center is *m*, and which engage with pinion *s* on shaft D, producing a reciprocating rotary motion of said shaft while the said pin *b*, projecting from the short arm of lever *z*, is traveling in the straight parts of said groove, which straight parts (as seen in the drawings, marked *i k*) are arranged at an acute angle with regard to each other, and are connected by a semicircular portion of said cam-groove, no motion of said lever being produced while the said pin is traveling in said semi-circular part.

Rotary shaft D is supported in suitable bearings in arms *a* and *a′*, the said pinion *s* being placed on the end of said shaft outside of arm *a*. Said shaft D carries two grooved lifter-cams, T T, which are formed as seen in Figs. 13 and 14, which exhibit inner side views of said cams. Besides these cams, the shaft D supports by means of two bent arms, U U, a bar, V, arranged as seen in the drawings, this bar V, when in use, having a strip of card filleting affixed along its under surface, and it may be termed the cleansing or brush bar.

Each top card B B is supported in the usual way on two pins, W, extending from the frame of the card or arch and through the top card near its end. There is also projecting from each end of the top card a small stud, *x*. When the shaft D is turned in one direction it carries the lifter-cams T T toward the studs in the end of the top card for the purpose of raising it. The said studs will be received into the grooves of the cams T T, and owing to the eccentricity of the grooves and their peculiar action on the studs the top card will be raised upward from off its seat, and the brush or card bar V will be carried by the rotary movement of shaft D underneath and in contact with the filleting of said top card. The grooves of the lifter-cams T T are so formed as to cause the entire under surface of the card of filleting to be brought thoroughly into contact with the cleansing-bar V, the act of cleansing being effected in this wise, viz: The first or forward movement of the brush-bar carries said brush-bar under the top cord; then the shaft D being rotated in the opposite direction, the said cleansing-bar is again brought into thorough contact with the filleting of the top card, and in its backward movement cleanses said top card. As soon as the act of cleansing the top card is effected, the lifter cams T T depress the top card back to its seat.

The cross connection-bar *d* supports by means of two hangers, *f f*, the pan or trough F, and a narrow bar, *g*, of the same length of the pan, fixed on the edge of the pan nearest the card stripper, when at rest. On the upper surface of said bar is affixed a narrow strip of card-filleting. The brush-bar V, in its return movement, after cleansing a top card, passes over said narrow bar, face to face, and there rests until another movement of the rotary shaft D. At the next movement of the shaft D the filleting on the brush-bar engages with the filleting on the narrow bar, and is thoroughly cleansed, producing a clean brush-bar every time a top card is cleansed, and when the bar V passes over the narrow bar, face to face, as aforesaid, forces and deposits the waste from said narrow bar into said pan.

There is attached to and projecting from the circular frame-work or arch, which supports the top cards, the flanges R and R′, containing a series of teeth having between them slots or openings G and G′ corresponding to the position of the series of top cards, excepting that at the end of the flanges, on the doffer side of the card, there are two slots beyond the range of tops, and at the other end are two slots connected by a curved groove, extending beyond the range of top cards. There are also connected by a curved groove two other slots, being the third and fourth from the doffer side, the purpose of which slots and grooves will be more fully explained hereinafter. I will observe that in the manufacture of new cards, the said flanges may be cast as part of the new card-frame, and on old cards may be attached to the arch by screws; thickness of the flanges about half an inch.

Figures 22, 23:
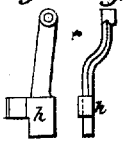

The detent-levers I I′ are shown detached in Fig. 15 of the drawings, which is a side view. The space *n* on this figure represents a large slot in said lever. The small oblong space at the other end of this figure represents a small slot. The round space between the two slots is a hole in the lever. Fig. 16 represents an edge view of the same lever, I. The form of stands *h* and *h′* is shown in Fig. 22 in side view and in Fig. 23 in edge view. Stands *h* and *h′* are attached to arms *a* and *a′* by bolts or rivets, as shown on Figs. 8 and 11 of the drawings. Said stands support levers I and I′ by means of studs or screws passing through the round holes in said levers referred to in Fig. 15, as seen between the two slots, and into the round holes in the top of stands *h* and *h′*, as shown in Fig. 22, and said levers vibrate freely on said studs or screws.

The detents K and K′ slide in bearings in arms *a* and *a′*, formed by means of tap *p* and rivets, and by a lip of studs *h* and *h′*, as seen in Figs. 7, 8, 10, and 11, and are connected near their upper ends with levers I and I′ by means of pins or studs projecting from their upper ends through holes in the ends of said levers, which holes are the small slots in said levers referred to in description of Fig. 15, which pins or studs work freely in said small slots. There is projecting from the inner sides of worm-gears Y and Y′ round pins J and J′. These round pins pass through slots *n* in levers I and I′, and project far enough to operate also in the slots or openings G G′ in flanges R and R′. By the rotary motion of gears Y and Y′ the round pins J and J′ describe a circle, the diameter of which is the space of two slots G G′, and the center of which and the inner points of the flanges or openings of the slots are equidistant from the center of the card-cylinder, so that when the pins J J′ shall each have entered, traversed, and passed out of a slot the said pins shall have performed half a revolution. The slots being fixed and stationary, and the frame being movable on its axis, the said pins J and J′ by their action in said slots will have moved the cleansing-frame the space of two slots or top cards. During the remainder or other half of the revolution of gears Y and Y′ the pins J and J′ being removed from contact with the slots of the flanges R and R′, no motion of the cleansing-frame is produced; but by the continued rotary motion of gears Y and Y′ during the other half of its revolution the same pins, J and J′, acting in slots *n* of levers I and I′, produce an action of said levers by which the detents K and K′ are held longitudinally in slots in flanges R and R′, thereby holding the cleansing-frame in a state of rest, while simultaneously therewith the pin *b* traverses the angular or straight parts *i k* of the groove in gear Y, operating through bent lever *z*, the rotary shaft D, and the stripping operation is performed. The top card is restored to its seat and the detentive bars K and K′ are withdrawn from the flanges at the same time that the revolution of gears Y and Y′ is completed. Thus during one complete revolution of gears Y and Y′ the cleansing-frame is moved the space of two top cards, and is there held firmly at rest while the lifting, stripping, and depressing machinery does its office, the movement of the cleansing-frame occupying one-half of said revolution of said gears, and the holding of the frame, and process of stripping a top card occupying the other half of said revolution, the action on pin *b* of the groove on the outside of gear Y, moving the said lifting and stripping mechanism, the action of pins J and J′ upon the backside of gears Y and Y′ operating in slots *n* of levers I and I′, moving the holding and steadying mechanism and the same pins, J and J′, operating in slots G and G′ of flanges R and R′, effecting the movements of the cleanser-frame from card to card, all as hereinbefore particularly set forth and specified. The said cleanser-frame having traversed the series of top cards, cleansing every other card in succession, and having arrived at and cleansed card 2 of the series, (marked 2 in the drawings,) the pins J and J′ enter the slots marked 2 on the drawings in flanges R and R′ and move therein until they arrive at the points $D^2$, (or at the top slots 2,) at which point the frame will have been moved during the engagement of the pins in the slots the space of one top card. At this time the end of lever *o* is brought in contact with the shipping-dog M′. (I will here observe that shipping-rod *q*, with shipping-dogs M and M′ are shown in the drawings in connection with stand *e* in Fig. 24 in top view and in Fig. 25 in side or end view. I will also observe that lever *o* vibrates on a stud affixed to arm *a*, said stud being shown in Fig. 9 on the right limb of said lever, also that there is a spring (marked *) shown in Fig. 9, attached to arm *a*, which is to assist lever *o* in holding clutch N into engagement with gears Q and Q′.) Lever *o* being brought in contact with shipping-dog M′, clutch N is thrown out of engagement with the teeth on the hubs of gear Q, and into engagement with the teeth on the hubs of gear Q′, thereby causing the shafts H H′ and $H^2$ to rotate in the reverse direction and the pins J and J′ to move off through the curved grooves into slots 1, and out of slots 1, no motion of the cleansing-frame being produced while the pins are moving through the curved grooves and through slots 1, and while top card, 1, is being raised, cleansed, and restored to its place. Thereupon the cleansing-frame, owing to the reverse motion given to shafts H, H′, and $H^2$, moves back over the series of top cards operating upon and cleansing those cards which were not cleansed in the first or opposite circuit of the frame until it arrives at slots 19, when the same process of reversing the movements or circuit of the cleansing-frame is performed, and when the pins J and J′ arrive at the point D′ at the top or roof of slots 19, the frame during this engagement of the pins in the slots having moved the space of one top card, the opposite ends of lever *o* is brought in contact with shipping-dog M, clutch N is thrown up and out of engagement with the teeth in the hub of gear Q′ into engagement with the teeth in the hub of gear Q, the motion of the shafts H, H′, and $H^2$ is again reversed, (no motion being given to the frame while the pins are traveling in the curved grooves and out of slots 20,) card 18 is cleansed, and another retrograde or reverse movement is given to the cleansing frame, as before described, which reverse movements recur by the same process as often as the said cleansing-frame shall arrive at the end of its circuit in either direction. The two slots beyond 19 and 20, as seen in the drawings, being the two slots beyond the range of the top cards on the doffer side of the card, are to accommodate the action of the detents K and K′.

The arrangements hereinbefore particularly set forth are with a view to stripping every other card; but should it be desirable to employ this machinery to strip every card, or to strip any number in each circuit of the cleansing-frame, omitting any stated proportion greater than every other card, that object may be accomplished by simply moving pins J and J′ nearer to or farther from the center of gears Y and Y′, so that during the revolution of said gears the said studs shall describe a lesser or greater circle corresponding to the space occupied by any given number of tops or slots. The diameter of said circle being narrowed to the space of one slot, it will act on every card, or widened to the space of several it will leave an interval proportioned thereto upon the principle apparent in the foregoing specification. It being understood that when every card is not stripped in each circuit of the frame, but stated cards are alternately stripped and omitted, arrangements corresponding to and on the principles of the curved grooves between the slots at the ends of the circuits, hereinbefore described, must be made to effect the reverse movements of the cleansing frame, with reference to the alternate omissions or intervals.

If desired to strip every top card in addition to the removal of the pins as aforesaid, it will be necessary to fill up the curved grooves, so as to have none but simple slots. Also, should it be desired to dispense with any number of top cards at either end of the series, the range or circuit of the cleansing-frame may be limited accordingly by simply moving the dogs M or M′ or both on the shipping-rod *q*, by which lever *o* may be brought in contact therewith at any point of the circuit of the cleansing-frame, and the circuit or movement of said frame be thereby reversed at such point, in manner hereinbefore particularly set forth. It being understood here, also, that where every card is not to be stripped during each circuit, but alternate omissions are to occur, it will be necessary to have at the termini of the circuit arrangements corresponding to and on the principle of the curved grooves before described, in order so to reverse the movements of the cleansing-frame that the stripping apparatus shall perform at the desired intervals alternately, as well as within its limited circuit.

I will here insert a more particular description of the curved grooves referred to. They are shown in Figs. 2 and 3 of the drawings, and are the spaces defined by lines drawn between slots 1 and 2 and between slots 19 and 20, and are of sufficient depth to admit the pins J and J′, while engaged in the slots, to pass through them from from one slot to the other.

The above-described improved mechanism may be divided or separated into three principal divisions or classifications, to wit: First, a "cleansing mechanism" proper, consisting of the waste-pan F, brush bar V, and card-filleting *g*, arranged to clean the brush-bar, in combination with the parts operating more immediately in connection therewith to raise, cleanse, and depress or restore the top cards; and, second, a "traversing mechanism" proper, consisting of the cross connecting-shaft H′, rotating shafts H $H^2$, and racks or arches G G′, in combination with the parts operating more immediately in connection therewith to produce traversing movements of the cleansing-frame; and, third, a detent or "locking-mechanism," consisting of parts which operate to lock or securely fasten and firmly hold the cleansing-frame while a top card is being cleansed or "stripped." In a self stripping carding-engine these mechanisms in combination form what may be termed the "stripping mechanism." It will be seen that these several mechanisms, as arranged in my improved self-stripping carding-engine herein described, bear a peculiar relation to each other and to the arms *a a′*, being all intimately connected or combined with the said arms and with each other, and located mostly above the shaft of the main carding-cylinder, in such a manner as to traverse or be carried by the said arms, which may be in one sense considered a part of either of said mechanisms. This arrangement affords a compactness, simplicity, and effectiveness in card-stripping mechanism not previously attained.

It is of the utmost importance in all card cleansing or stripping mechanisms of the nature herein described that uniform movements of the two sides of the cleansing-frame should be maintained, for reasons which will be readily seen and understood by all conversant with such matters. Prior to my invention the two sides of the cleansing-frame have usually been constructed in an indirect manner by means of a train of mechanism located at the end of or under the card-frame, through which movements have been communicated to the said frame, or from the mechanism at one side of it to that at the opposite side; but such an arrangement is, in my opinion, objectionable for various reasons, which, I think, will be apparent to all practical carders acquainted with the nature and operation of self-stripping carding-engines. What I consider as the principal objections being the increased cost of a carding-engine so constructed, the greater amount of power required to run it, the increased quantity of oil required to lubricate it, and unreliability of action as well as liability to get out of order, necessarily arising from the large number of parts used and the nature of their arrangement. For the purpose of obviating these objections I make use of a cross connecting-shaft, H′, which directly connects the mechanism at the opposite ends of the carding-engine, and which is so disposed as to traverse with the cleansing-frame arms; and by mechanism operating through said shaft, also traversing with said arms, I cause both sides of the cleansing-frame to move in unison, as described, thereby producing results which cannot be so readily and perfectly attained by any other method.

The importance of locating and combining the cleansing and traversing mechanism, as I do in my improved self-stripping carding-engine, by which great simplicity, compactness, and efficiency are attained, will be readily appreciated by the practical carder, and is, in my judgment, a great improvement over any arrangement of those parts existing in self-stripping carding devices prior to my invention. It is also of great importance that the cleansing-frame should be firmly and positively "locked," or kept at rest, while the operation of raising, cleaning, and depressing or restoring each top-card is effected. This is accomplished more effectively where all or nearly all of the principal parts of the locking mechanism are disposed in the vicinity of the upper ends of the cleansing-frame arms, as in my improved stripping mechanism, than it is where any considerable part of them are at a distance from that locality.

My improvement also consists in the combination of a pulley, P′, with the traversing, locking, and cleansing mechanisms, when all of said mechanisms are arranged to traverse with the cleansing-frame, as described, said pulley being located in such a manner that all parts of the stripping mechanism of the carding-engine are actuated or driven by a single belt acting on or through said pulley. To accomplish this I locate the pulley on a line with the axis of the shaft of the main cylinder of the carding-engine, as shown, as by that arrangement the whole mechanism is greatly simplified, and from that point the most efficient and perfect movements can be communicated to all parts of the stripping apparatus in all of the varying positions of the cleansing-frame.

Prior to my invention the cleansing mechanism of all self-stripping carding-engines, as far as I am aware, was very imperfect, from the fact that no efficient means was provided in such engines for the perfect cleansing of the brush-bar prior or preparatory to the cleansing of each top card.

My improvement in this relation consists principally in providing a card clothed surface, against or in contact with which the card on the brush-bar is brought and cleansed prior to the cleansing of each top card.

By my invention or improvements, as herein set forth, I consider that the following, among other results, have been attained, to wit: First, dispensing with a large part of the costly, complicated, and unreliable machinery used in self-stripping carding-engines to produce the necessary movements of the cleansing-frame; second, producing accurate and reliable movements of said frame by means of a simple and direct acting mechanism traversing with the frame itself; third, so combining and arranging the traversing, cleansing, and locking mechanisms with each other and with a pulley as that all parts of the stripping mechanism may be actuated or driven by a single belt acting on or through said pulley.

I have termed the shaft H′ a "cross connecting-shaft," in contradistinction to a shaft, which simply fastens the frame together like *d*, or to a rotary or rocking shaft used in immediate connection with the brush-bar like D, because said shaft H′ directly connects the traversing mechanism of the opposite sides of the cleansing-frame across or over the top of the carding-engine, in the manner and for the purposes specified.

I am aware that there is found described in George Wellman's patent of December 6, 1853, a shaft carried by the arms of the cleanser-frame; but said shaft is simply a rotary cam-shaft forming a part of the cleansing mechanism, and performs no office whatsoever analogous to shaft H′ in producing the traversing movements of the cleansing-frame, as, by reference to said patent, it will be seen that it merely carries the cams for raising the top cards, and cleaning and depressing the same, the traversing mechanism in said carding-engine consisting in segments on the lower ends of the cleansing-frame arms, in connection with a complicated arrangement of shafts, wheels, bevel-gears, spur-wheels, mangle-wheels, and escapements, located and arranged at the sides and end of the card. I therefore lay no claim to said cam-shaft in itself considered, or when used simply as described in said patent.

I am also aware that in the English patent granted to W. H. Richie, September 27, 1844, and numbered 10,334, there is found a shaft similar in its arrangement and uses to the cam-shaft shown in the Wellman patent; but the shaft H′ is different from and used in addition to the shafts (shown in either of said patents) which operate the brush-bar in the machine of the said Richie, motion being communicated between the two sides of the cleansing-frame through a train of mechanism located under or at the end of the main frame of the carding-engine. There is also found in said English patent a toothed rack or arch, the same being a part of or used in combination with the card-frame; also, a cam and gear located on the arm of the cleansing-frame, and operating the cleansing or brush bar. I therefore do not claim the said rack or toothed arch in itself considered; neither do I claim a cam and gear mounted on the arm of the cleansing-frame, in themselves considered; neither do I claim the said arch, cam, or gear located, as described, without reference to what I combine with them, (not, however, by this disclaiming in any degree the arrangement and use of the grooved cam and sliding bar, or cam and lifter-bar secured to me by Letters Patent of the United States, dated August 1, 1854, said arrangement of a cam and lifter-bar being essentially different from anything shown in said English patent.) Neither do I claim the combining of lifter-cams T T with brush-bar V and rotary shaft D, nor any device, combination, or improvement described and specified in my said Letters Patent of August 1, 1854, the said devices, combinations, and improvements being already secured to me thereby; but

I claim as of my invention in self-stripping carding-engines, or in the mechanism for stripping or cleansing the top cards of carding-engines, the following, to wit:

1. A cross connecting-shaft, H′, so disposed in relation to the cleansing-frame arms *a a′* as to be carried by or to traverse with them when said shaft is used in combination with mechanism operating in connection with said arms, which produces by means of or through the said shaft, so disposed, conjoint or uniform intermittent reciprocating traversing movements of the two sides of the cleansing-frame, substantially in the manner and for the purposes set forth and specified.

2. A traversing mechanism proper, substantially such as described, and a cleansing mechanism proper, substantially such as described, combined in the manner and for the purposes set forth and described.

3. A traversing mechanism proper, substantially such as described, a cleansing mechanism proper, substantially such as described, and a locking mechanism proper, substantially such as described, combined in the manner and for the purposes specified.

4. A detent or locking mechanism, constructed substantially in the manner and for the purposes shown.

5. The combination of a traversing mechanism, cleansing mechanism, and detent or locking mechanism with a pulley, P′, located on a line with the axis of the main cylinder of the carding-engine, so that the whole stripping mechanism may be actuated or driven by a single belt acting on the said pulley, substantially as and for the purposes set forth and specified.

6. A brush-bar, V, and waste-pan F, disposed in the upper part of the cleansing-frame and carried thereby, in combination with a card-clothed surface or strip of card-filleting, so disposed or arranged in reference to the said brush-bar as to remove the waste from the same, or to cleanse the card of said bar, prior or preparatory to the cleansing of each top card, substantially in the manner and for the purposes specified.

7. In combination, the lever *o*, dogs M M′, rod *y*, and sliding clutch N, arranged and operating to reverse the motion of the cleansing-frame, substantially as and for the purposes specified.

8. The grooves across the teeth connecting the space or slots between the teeth of the toothed rack, in combination with such teeth, whereby the series of top cards, being cleansed, is changed, substantially as and for the purposes set forth and described.

HORACE WOODMAN.

Witnesses:

J. H. BURNHAM,
GEORGE N. WALKER.